(12) United States Patent
Cobb

(10) Patent No.: US 7,330,314 B1
(45) Date of Patent: Feb. 12, 2008

(54) COLOR COMBINER FOR SOLID-STATE LIGHT SOURCES

(75) Inventor: Joshua Monroe Cobb, Victor, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/711,926

(22) Filed: Feb. 28, 2007

(51) Int. Cl.
*G02B 27/14* (2006.01)
*G02B 17/00* (2006.01)
*F21V 7/00* (2006.01)
*F21V 1/00* (2006.01)
*F21V 11/00* (2006.01)

(52) U.S. Cl. .................... 359/634; 359/726; 362/341; 362/241

(58) Field of Classification Search ............ 359/634, 359/636, 618, 726–731; 362/341, 347, 241, 362/243
See application file for complete search history.

(56) References Cited

U.S. PATENT DOCUMENTS

| | | | |
|---|---|---|---|
| 4,870,268 A | 9/1989 | Vincent et al. ............ 250/226 |
| 5,841,596 A * | 11/1998 | Perlo et al. ................ 362/347 |
| 6,545,814 B2 | 4/2003 | Bartlett et al. ............. 359/636 |
| 6,676,260 B2 | 1/2004 | Cobb et al. ................ 353/31 |
| 6,956,701 B1 | 10/2005 | Peterson et al. ........... 359/618 |
| 7,048,385 B2 | 5/2006 | Beeson et al. ............. 353/97 |
| 2005/0254018 A1 | 11/2005 | Magarill et al. ........... 353/94 |
| 2006/0126178 A1 | 6/2006 | Li .............................. 359/485 |

* cited by examiner

*Primary Examiner*—Alicia M Harrington
(74) *Attorney, Agent, or Firm*—Timothy M. Schaeberle

(57) ABSTRACT

An illumination apparatus has first and second optical condenser systems sharing a common aperture. The first optical condenser system has a first solid-state light source having a first spectral band and a first curved surface spaced apart from the first solid-state light source and treated to reflect the first spectral band along a first optical path to exit at the common aperture and to pass light outside the first spectral band. The second optical condenser system has a second solid-state light source having a second spectral band and a second curved surface disposed behind the first curved surface with respect to the first and second light sources and treated to reflect the second spectral band along a second optical path to exit at the common aperture.

21 Claims, 18 Drawing Sheets

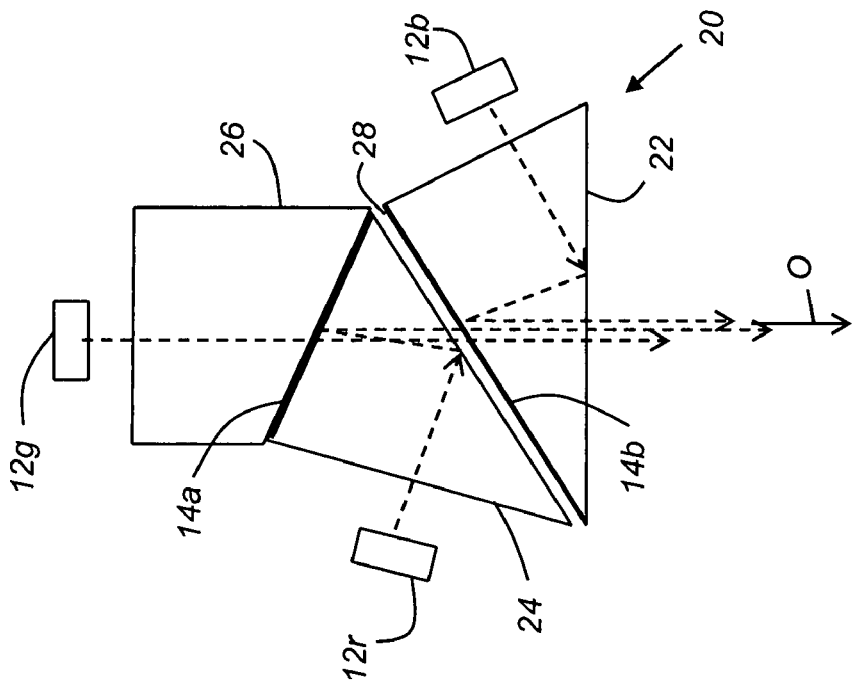
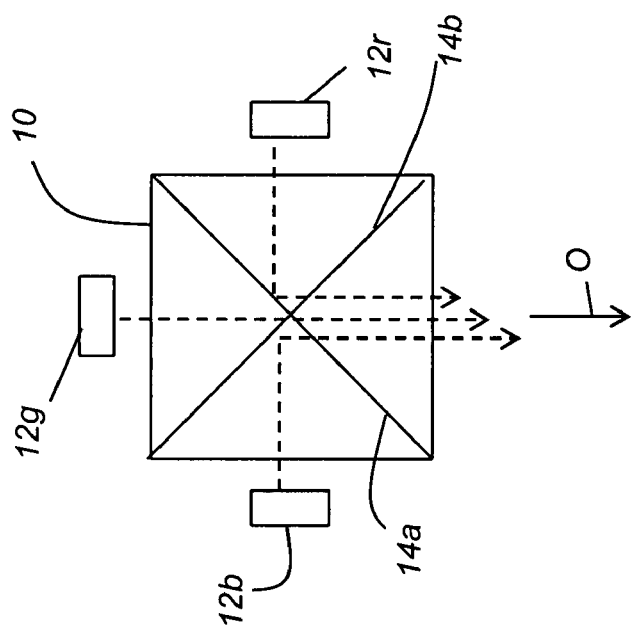

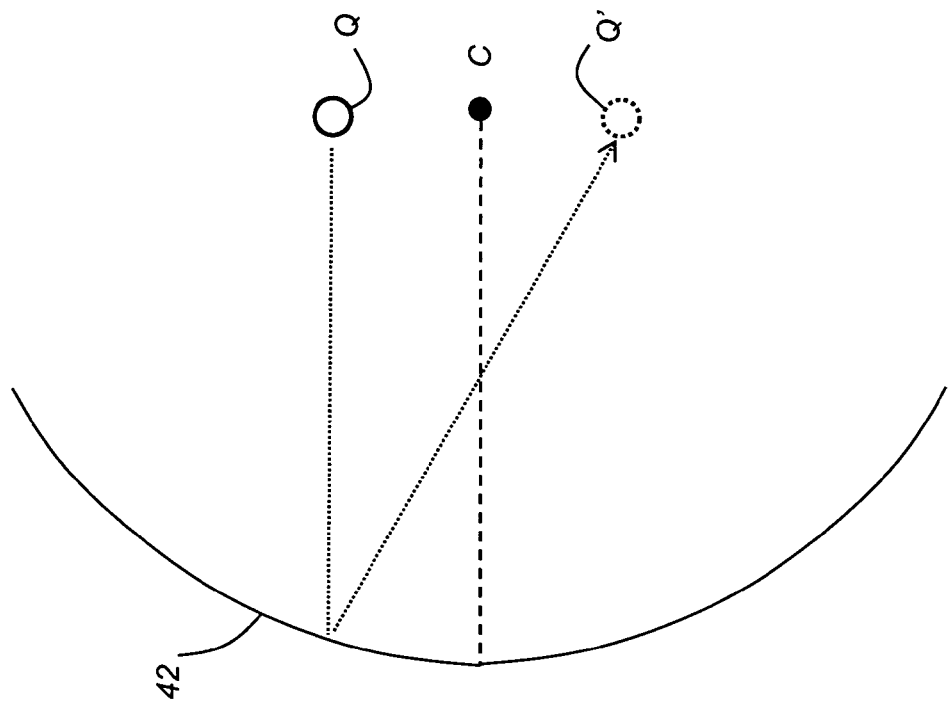

COLOR COMBINER FOR SOLID-STATE LIGHT SOURCES

CROSS REFERENCE TO RELATED APPLICATIONS

Reference is made to U.S. patent application Ser. No. 11/640,725 filed 18 Dec. 2006 and entitled "Light Collector and Concentrator" by Cobb et al.

FIELD OF THE INVENTION

This invention generally relates to illumination apparatus and more particularly relates to an illumination apparatus and method for display using solid-state light sources.

BACKGROUND OF THE INVENTION

With continuing improvement in digital imaging technology, digital light modulation is used for a wide range of display devices such as rear projection TVs, motion picture projectors for business and entertainment markets, digital printers, and other imaging apparatus. In the development and design of such apparatus, the challenge of providing illumination having sufficient brightness is widely acknowledged. For some types of digital imaging devices in particular, such as digital projection devices, the inability to provide sufficient brightness presents a serious performance constraint. Conventional illumination solutions for digital projectors, such as UHP (Ultra-High Performance) lamps or high-pressure mercury arc lamps or Xenon arc lamps, have been employed for some digital projection systems, but are disadvantaged for a number of reasons, including short lifetimes, deterioration with age, high heat, environmentally hazardous component materials, and constrained color gamut.

Until recently, solid-state light sources such as Light Emitting Diodes (LEDs) did not exhibit high enough power levels for projection. However, high-brightness LED sources are now being commercialized and used satisfactorily in illumination systems for smaller devices, such as pocket projectors and Rear-Projection Television (RPTV) devices. When compared against conventional lamp-based illumination solutions, LEDs have some inherent advantages such as lower power consumption, longer component life, and elimination of warm-up requirements. In addition, the relative spectral purity of these sources offers the promise of a broader color gamut than is provided by conventional high-brightness lamps. LEDs also do not have environmentally hazardous materials such as the mercury contained in metal-halide lamps. LED brightness is also adjustable over a range, without changing its spectral characteristics.

As higher-brightness LEDs are being developed, there has been considerable attention directed to adapting these solid-state light sources for use in digital display and projection apparatus. For many types of display and projection designs, it is necessary to combine the light from single-color LEDs, typically Red (R), Green (G), and Blue (B) LEDs, onto a single light path, and then to direct the light to a spatial light modulator (SLM), such as a digital micromirror device (DMD) used in DLP® projection systems from Texas Instruments, Inc., Dallas, Tex.

The proposed solutions for color combination when using single-color LEDs generally use an arrangement of dichroic surfaces and light integrating components. Referring to the perspective view of FIG. 1A, there is shown an illumination apparatus 30 that employs an integrating rod 34 for mixing light from an LED assembly 32 that has two green LEDs 12g, one red LED 12r, and one blue LED 12b. Acting as a light guide that directs light by Total Internal Reflection (TIR), integrating rod 34 homogenizes the light input from the different color LEDs on LED assembly 32 to provide polychromatic light at its output 36.

The solution shown in FIG. 1A may be workable for some types of low-end display devices, but is very inefficient. As is well known to those skilled in the imaging arts, any optical system is constrained by geometrical considerations, expressed in terms of etendue or, similarly, in terms of the Lagrange invariant, a product of the acceptance solid angle and the size of the aperture at any given plane in an optical system. Where an optical system is matched and symmetric, Lagrange and etendue values are identical throughout the system. In optical systems that are not matched or symmetric, the etendue is the smallest value that allows light through the system. In the particular example of FIG. 1A, etendue-matching is relatively poor, since the output beam of light is twice as large as need be. It would be advantageous to overlap light of each of the three colors onto the same path, with an area the size of the two green LEDs 12g.

Etendue and the corollary Lagrange invariant provide ways to quantify an intuitive principle: only so much light can be provided from an area of a certain size. As the emissive area gets smaller, the angle of emitted light gets larger in order to preserve the equivalent brightness.

Added complexity and cost result from the requirement to handle illumination at larger angles. This problem is noted and addressed for high-density Liquid Crystal on Silicon (LCOS) devices in U.S. Pat. No. 6,758,565 entitled "Projection Apparatus Using Telecentric Optics" to Cobb et al.; U.S. Pat. No. 6,808,269 entitled "Projection Apparatus Using Spatial Light Modulator" to Cobb; and U.S. Pat. No. 6,676,260 entitled "Projection Apparatus Using Spatial Light Modulator with Relay Lens and Dichroic Combiner", to Cobb et al. These patents disclose electronic projection apparatus design using higher numerical apertures at the spatial light modulator for obtaining the necessary light while reducing angular requirements elsewhere in the system.

In display and projection apparatus, it is most desirable to match, as closely as possible, the etendue of the spatial light modulator (SLM). As a general rule, increased etendue results in a more complex and costly optical design. For a projector using the component arrangement of FIG. 1A, for example, lens components in the optical system must be designed for large etendue.

There have been a number of solutions proposed for using an integrating rod with LED sources in order to reduce etendue. For example, U.S. Pat. No. 6,956,701 entitled "Method and Apparatus for Combining Light Paths of Multiple Colored Light Sources Through a Common Integration Tunnel" to Peterson et al. describes an illumination arrangement that directs light from multiple LEDs through an integrating tunnel. Various embodiments are described in the Peterson et al. '701 disclosure for directing light from multiple LED sources into a single integrator element. However, solutions such as those proposed all tend to increase the etendue of the exiting light and can have other problems. For example, one solution proposed in the Peterson et al. '701 disclosure (FIG. 6 in the '701 disclosure) and utilized in illumination devices such as the ZoroLight™ LED Multiplexers from Bookham Display Products, Santa Rosa, Calif. can exhibit various problems that cause inefficiency and increase etendue. FIGS. 1B and 1C show how some of these problems can occur. In FIG. 1B, integrating rod 34 is a light guide formed from a solid transparent material. A green LED 12g directs light into one end of integrating rod 34. A blue LED 12b directs light into integrating rod 34 from the side. This blue light is reflected from a dichroic surface 18, internal to integrating rod 34 that folds the light paths together by transmitting green light from LED 12g and reflecting blue light from LED 12b. The preferred light path for blue LED light is shown in the solid line reflecting from the inner surface of integrating rod 34, then exiting integrating rod 34 at the right. Light loss is indicated in a dashed line labeled 38a shown exiting integrating rod 34 at an angle. This light loss can be due either to light that misses dichroic surface 18 altogether or to the imperfect performance of dichroic surface 18, which typically exhibits at least some light leakage, particularly at higher incident angles.

FIG. 1C shows an inherent problem with a related design in which integrating rod 34 is a hollow light tunnel that has a reflective inner coating. While a portion of the light reflected from dichroic surface 18 exits as intended, as shown by the solid line that exits integrating rod 34 at the right, light that does not reflect properly from dichroic surface 18 is reflected at very high angles and thus exits integrating rod 34 at very high angles, as shown by the dashed line labeled 38b. This high angle light significantly increases the etendue of the illumination system.

One solution for reducing overall etendue is to combine different color LED light sources onto the same optical path. FIGS. 2A, 2B, and 2C show conventional approaches that use various arrangements of dichroic surfaces for combining color paths or combining colors to form a polychromatic or "white" light from LED sources. FIG. 2A shows an X-cube or X-prism 10 formed from four angled prisms having dichroic coatings and fabricated as described, for example, in U.S. Pat. No. 5,098,183 entitled "Dichroic Optical Elements for Use in a Projection Type Display Apparatus" to Sonehara. X-prism 10 provides crossed dichroic surfaces 14a and 14b that are treated to direct light from a red LED 12r, green LED 12g, and blue LED 12b onto an optical axis O. Approximate light paths for each source are represented by dashed lines in FIGS. 2A, 2B, and 2C; in practice, each LED 12r, 12g, and 12b emits a cone of light and the cones of light are combined onto one path by each of these devices. There are numerous examples of color combining and separation components that employ X-cubes or X-prisms including, for example, U.S. Pat. No. 6,019,474 entitled "Modified X-Cube Arrangement for Improved Contrast Projection Display" to Doany et al. and U.S. Pat. No. 6,327,092 entitled "Cross Dichroic Prism" to Okuyama.

Another conventional color combiner is the Philips prism 20 shown in FIG. 2B. The Philips prism assembly is well known to those skilled in the digital projection arts and its use is described in a number of patents, including, for example, U.S. Pat. Nos. 4,084,180 entitled "Color Splitting Prism Assembly" to Stoffels et al., and 6,144,498 entitled "Color Separation Prism Assembly And Method For Making Same" to Bryars et al. Philips prisms have been employed as chromatic separator or combiner components in projector designs such as those disclosed in U.S. Pat. Nos. 6,280,035 and 6,172,813 (both to Tadic-Galeb et al.), U.S. Pat. No. 6,262,851 (Marshall), and U.S. Pat. No. 5,621,486 (Doany et al.), for example.

Briefly, a Philips prism assembly comprises an assembly with two triangular prisms 22 and 24 and one prism 26 that is approximately rectangular. There is an air gap 28 between the two triangular prisms 22 and 24. The rectangular prism element is optically coupled to a face of one of the triangular prisms 24, opposite the face of prism 24 that lies at air gap 28. Dichroic surfaces 14a and 14b are coated onto one face of each of the two triangular prisms 22 and 24. With this arrangement, light from red LED 12r is incident at a first surface of prism 24 and is then reflected from a second surface due to Total Internal Reflection (TIR). This directs the light to dichroic surface 14a that reflects red light onto optical axis O. Light from blue LED 12b is similarly reflected inside prism 22. Green light from LED 12g passes through both dichroic surfaces 14a and 14b.

A third type of color combiner, shown in FIG. 2C, uses angled dichroic surfaces 14a and 14b to combine light and direct the combined polychromatic light along the direction of a common optical axis O. Surfaces 14a and 14b may be encased within a prism structure or in air. One example color combiner using this arrangement is described in U.S. Pat. No. 6,676,260 entitled "Projection Apparatus Using Spatial Light Modulator With Relay Lens And Dichroic Combiner" to Cobb et al. that describes a V-prism combiner using angled dichroic surfaces.

Conventional solutions that are patterned on the basic arrangements of FIGS. 2A-2C have been implemented for various digital display and projection devices with some measure of success. However, due to the relatively large emission angle of LEDs, which can be as much as 120 degrees, and inherent characteristic of dichroic surfaces, there are drawbacks to each solution that limit performance when used for combining color paths. As is described in detail in the '260 Cobb et al. disclosure, the spectral performance of dichroic surfaces degrades as incident light angle increases. At larger incident angles, polarization effects occur, so that the amount of light of different polarizations is not reflected equally at the same angle. This can cause color shifts in the light beam that is reflected or transmitted through the dichroic surface and can result in loss of some portion of the light. X-prism 10 designs are highly polarization-sensitive; Philips prism 20 devices are somewhat less polarization sensitive. The Philips prism solution of FIG. 2B is arranged to reduce the effects of this angular and polarization sensitivity by reducing the incident angle of light on dichroic surfaces. However, this improvement comes at the price of increased cost, size, and complexity.

Both the X-cube 10 solution of FIG. 2A and Philips prism 20 solution of FIG. 2B require relatively costly fabrication. In general, prism components and optical coatings are expensive to manufacture; with these devices, prisms must be accurately formed, then properly combined to form a single assembly. The individual prism elements must be made within narrow tolerances in order to direct each color on-axis. Any error made in prism assembly, whether resulting from the assembly method or from the tolerance variation of the individual prism elements, results in defective parts and lost value of coatings and components. The X-prism 10 is particularly vulnerable to tolerance problems, since it requires joining adjacent surfaces of four prisms having the appropriate dichroic coatings disposed at the proper angles.

For each of the color combiner arrangements shown in FIGS. 2A through 2C, the light output must be further conditioned by a light integrator for projector illumination. Where light sources are energized at separate times, the light integrator acts as a "uniformizer", that is, provides spatial uniformity. Where light sources are combined to provide polychromatic or "white" light, the light integrator provides further mixing of the light, generally termed homogenization, so that combined polychromatic light can be utilized as a uniform white light, with substantially equal uniformity between colors at all points across the illumination beam. Pre-combining the colors using dichroic surfaces, as described with reference to FIGS. 2A-2C, at least helps to minimize the performance requirements, cost, and size of integrator elements.

Thus, it can be seen that while LEDs and related solid-state light sources hold promise for high-brightness projector illumination apparatus, there is still considerable room for improvement. Problems with conventional illumination approaches such as unwanted color shifting, polarization constraints, reduced efficiency, and poor etendue matching must be overcome in order to take advantage of these solid-state light sources where high brightness levels are needed.

SUMMARY OF THE INVENTION

It is an object of the present invention to advance the art of illumination using solid-state light sources. With this object in mind, the present invention provides an illumination apparatus comprising:
first and second optical condenser systems sharing a common aperture, the first optical condenser system comprising:
a first solid-state light source having a first spectral band;
a first curved surface spaced apart from the first solid-state light source and treated to reflect the first spectral band along a first optical path to exit at the common aperture and to pass light outside the first spectral band;
and the second optical condenser system comprising:
a second solid-state light source having a second spectral band;
a second curved surface disposed behind the first curved surface with respect to the first and second light sources and treated to reflect the second spectral band along a second optical path to exit at the common aperture.

It is a feature of the present invention that it provides a color combiner using one or more dichroic surfaces that are suitably curved so that they receive light from an LED source at low incident angles.

It is an advantage of the present invention that it provides a compact apparatus for providing high-brightness illumination using LEDs.

It is a further advantage of the present invention that it provides a solution for color path combination and color mixing that reduces polarization requirements, so that light with any polarization state is handled with equivalent efficiency.

These and other objects, features, and advantages of the present invention will become apparent to those skilled in the art upon reading the following detailed description when taken in conjunction with the drawings, wherein there are shown and described illustrative embodiments of the invention.

BRIEF DESCRIPTION OF THE DRAWINGS

FIG. 2A is a schematic block diagram showing the use of an X-prism for color mixing with LED sources.

FIG. 2B is a schematic block diagram showing the use of a Philips prism for color mixing with LED sources.

FIG. 4 is a diagram showing the focal property of an elliptical mirror.

DETAILED DESCRIPTION OF THE INVENTION

Figure 1A:
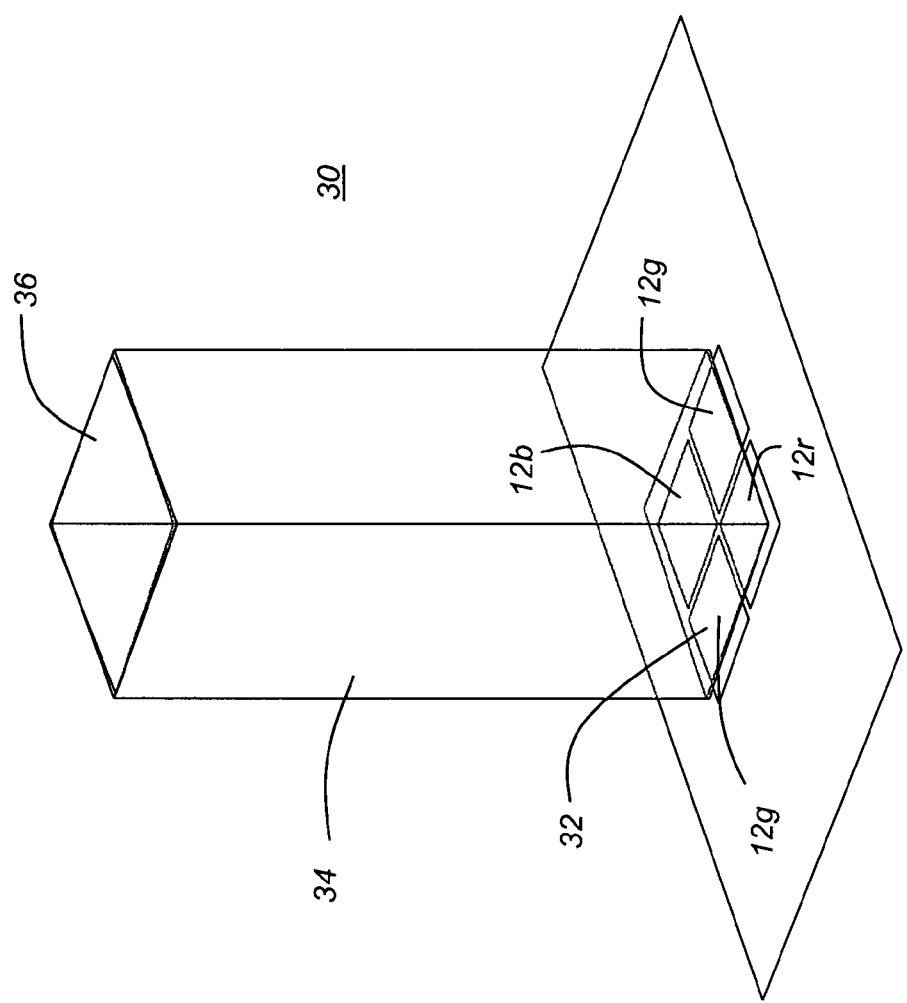
FIG. 1A is a perspective view showing color mixing using a single integrator bar.
Figure 1B:
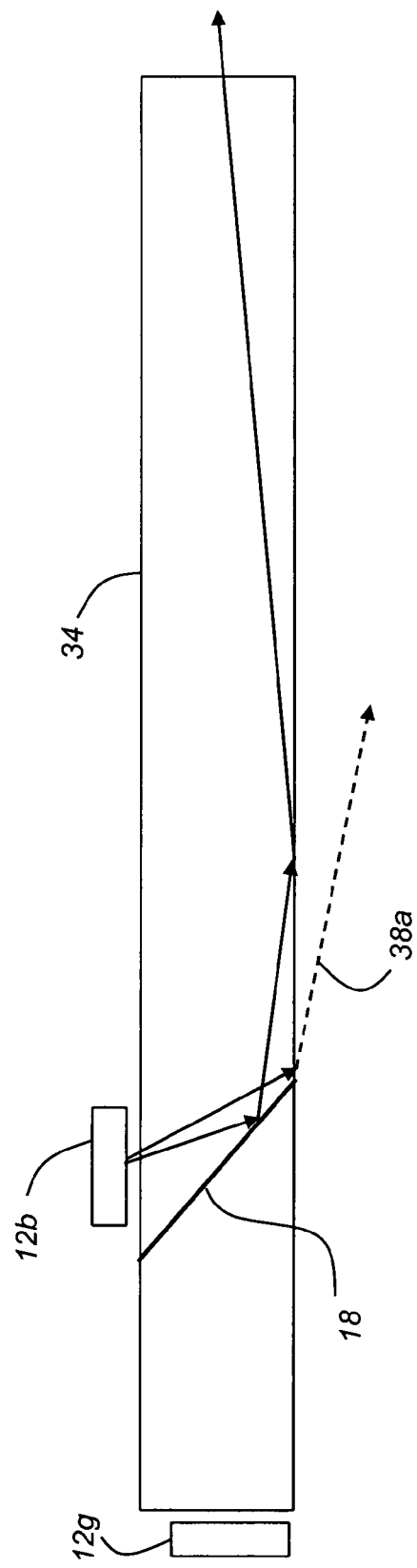
FIG. 1B is a side view of a solid integrating bar using two solid-state light sources.
Figure 1C:
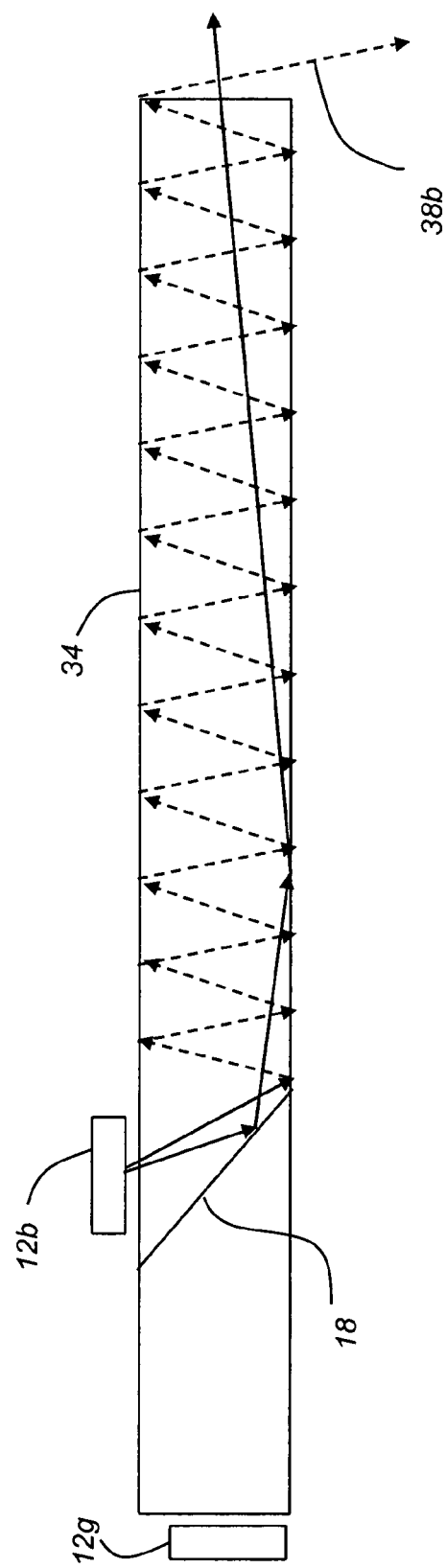
FIG. 1C is a side view of a hollow integrating bar using two solid-state light sources.
Figure 2C:
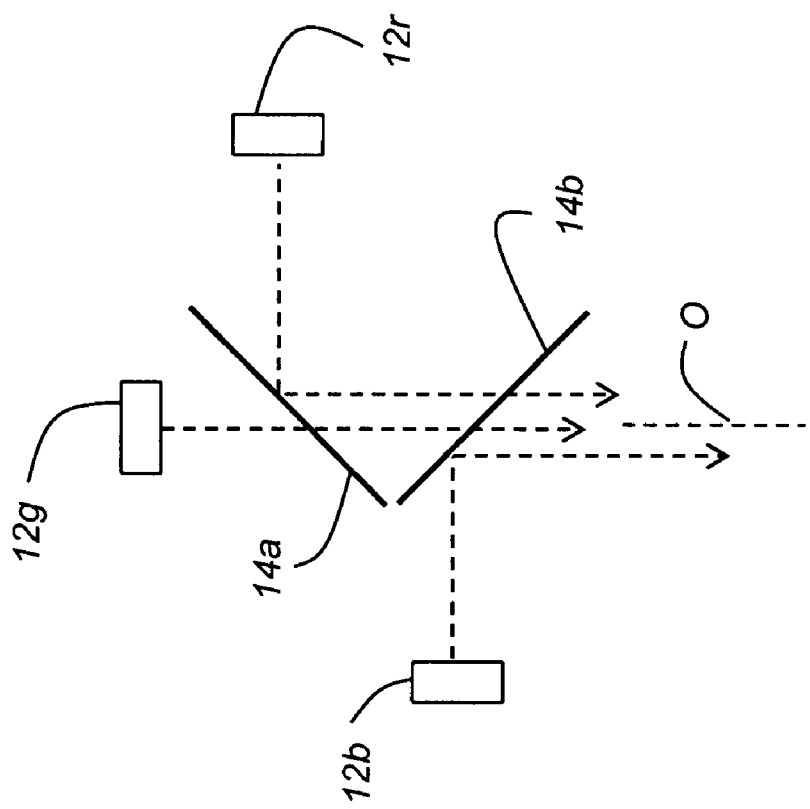
FIG. 2C is a schematic block diagram showing the use of angled dichroic surfaces for color mixing with LED sources.

The figures referenced in this description illustrate the general concepts and key structures and components of the apparatus of the present invention. These figures are not drawn with attention to scale and may exaggerate dimensions, proportion, and relative placement of components for the sake of clarity. The spectral bands described herein are given by way of example and not of limitation. It is to be understood that elements not specifically shown or described may take various forms well known to those skilled in the art.

As is well known, the distribution of light by a specific optical system depends on its overall geometry. For example, a perfect rotationally symmetrical paraboloid reflector would ideally direct light to a "focal point". However, as is familiar to those skilled in optical fabrication, only a reasonable approximation to such an idealized geometric shape can be realized in practice and a perfect focal point is neither achievable nor needed for efficient light concentration. Thus, instead of using the idealized "focal point" terminology, the description and claims of the present invention employ the more general terms "focal region" or simply "focus" to indicate, for an optical component that concentrates light, the area in space of highest light concentration or, for an optical component that redirects or collimates emitted light, the area in space within which a light source is most suitably placed to effect such desirable redirection or collimation.

The apparatus and methods of the present invention use curved surfaces that are concave with respect to their corresponding light sources. In the context of this disclosure, "opposed curvature" simply indicates that two concave reflective surfaces face each other. One surface might be said to have positive curvature (typically where the center of curvature lies to the right of the surface), the other surface to have negative curvature (where the center of curvature lies to the left of the surface).

In the context of the present invention, the term "optical condenser" or "optical condenser system" has the connotation conventionally used in the imaging arts. That is, an optical condenser or condenser system is a combination including one or more refractive or reflective optical elements that gather light from a light source and direct it to an object or to an imaging system, such as to a projection lens. The apparatus and method of the present invention employ a pair of optical condenser systems that are non-symmetric with respect to each other and whose light paths can be nearly overlapping, that are each provided with a separate light source, and that are both arranged to share a common aperture to which exiting light is directed.

The apparatus and method of the present invention minimize a number of problems encountered when using conventional solutions for combining colored light when using dichroic surfaces. To reduce the inherent problems that result from poor dichroic response at higher incident angles, the present invention provides a curved dichroic surface for directing light within a given spectral range, so that, due to this surface curvature, source illumination is incident at reduced angles. At the same time, the curved dichroic surface concentrates the light toward a focal region or focus, thereby enabling the etendue of the illumination apparatus to be suitably matched to other components in a projection or display apparatus.

Figure 3:
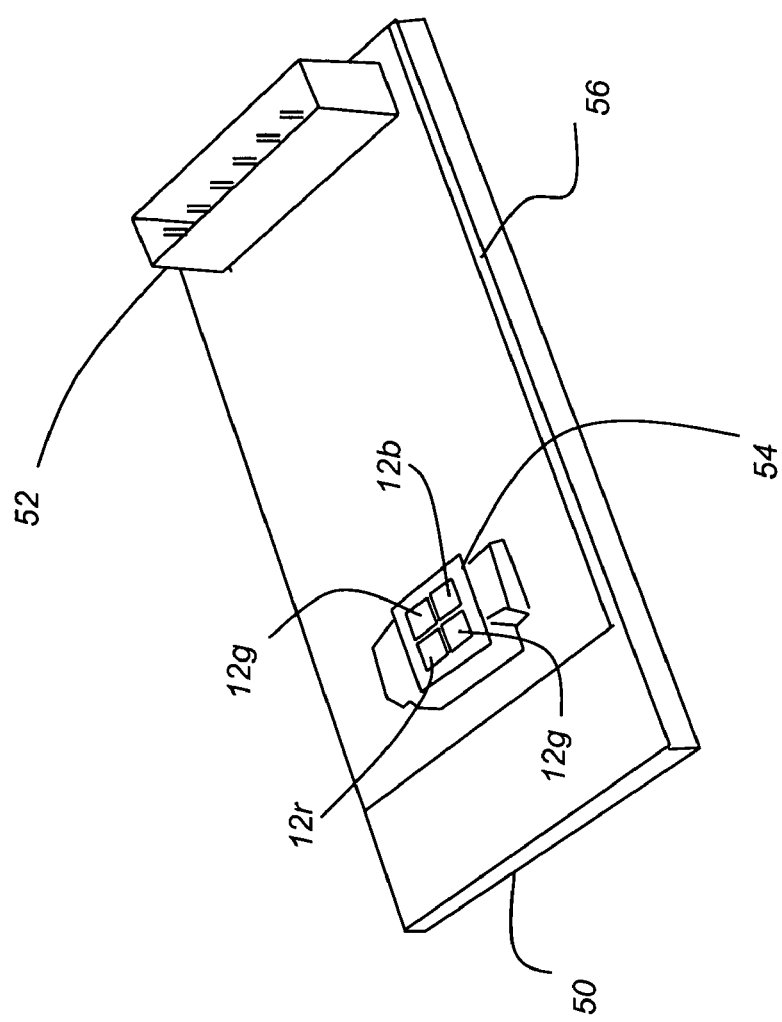
FIG. 3 is a perspective view showing an LED light source in one embodiment.

As used in the present application, the term "solid-state light source" has its meaning well understood in the illumination arts and includes devices such as light-emitting diodes (LEDs), organic light-emitting diodes (OLEDs), polymer light-emitting diodes (PLEDs) and similar light sources that employ inorganic or organic semiconductor materials and principles to generate light. Of particular interest for high brightness applications are high-lumen output LEDs such as the Ostar® LED devices from OSRAM Sylvania Incorporated, Danvers, Mass. FIG. 3 shows an LED module 50 in a design typically used for portable or mini-projectors, such as the SP-P300ME projector from Samsung Electronics America, Inc., Irvine, Calif. In addition to various support electronics and mounting components provided on a printed circuit (PC) board 56, LED module 50 has an electrical connector 52 and an LED package 54. In a typical embodiment, LED package 54 has a low dimensional profile and consists of four single-color LEDs, such as two Green LEDs 12g, one Red LED 12r, and one Blue LED 12b. Other arrangements of LEDs are possible, including the use of four LEDs of the same color, as might be appropriate for embodiments of the present invention that are described subsequently. Typically, LED package 54 has supporting optics for directing light outward from the module.

Embodiments of the present invention can be best understood by first reviewing straightforward principles of geometric optics. Referring to FIG. 4, there is shown a property of a spherical reflective surface 42. A point Q that is at a distance to one side of the center of curvature C is imaged at a point Q' that is equidistant from C. Where a light source is at Q, for example, the image of the light source is at Q'. For an ellipsoidal reflective surface, an idealized case, the point at a first focus is imaged at a second focus, without aberration.

Using the general principle shown in FIG. 4 then, a curved reflective surface, whether spherical, ellipsoidal, or paraboloid, can be disposed to form an image, at a second location, of an object that is positioned at a first location. In terms of the spherical reflector shown in FIG. 4, the present invention utilizes this focal property by positioning an LED light source at point Q and imaging the light source to point Q'. By selective shaping and treatment of a first curved dichroic surface, paired with a second curved reflective surface, the present invention adapts this principle for directing light from different color sources to a single aperture.

Figure 5A:
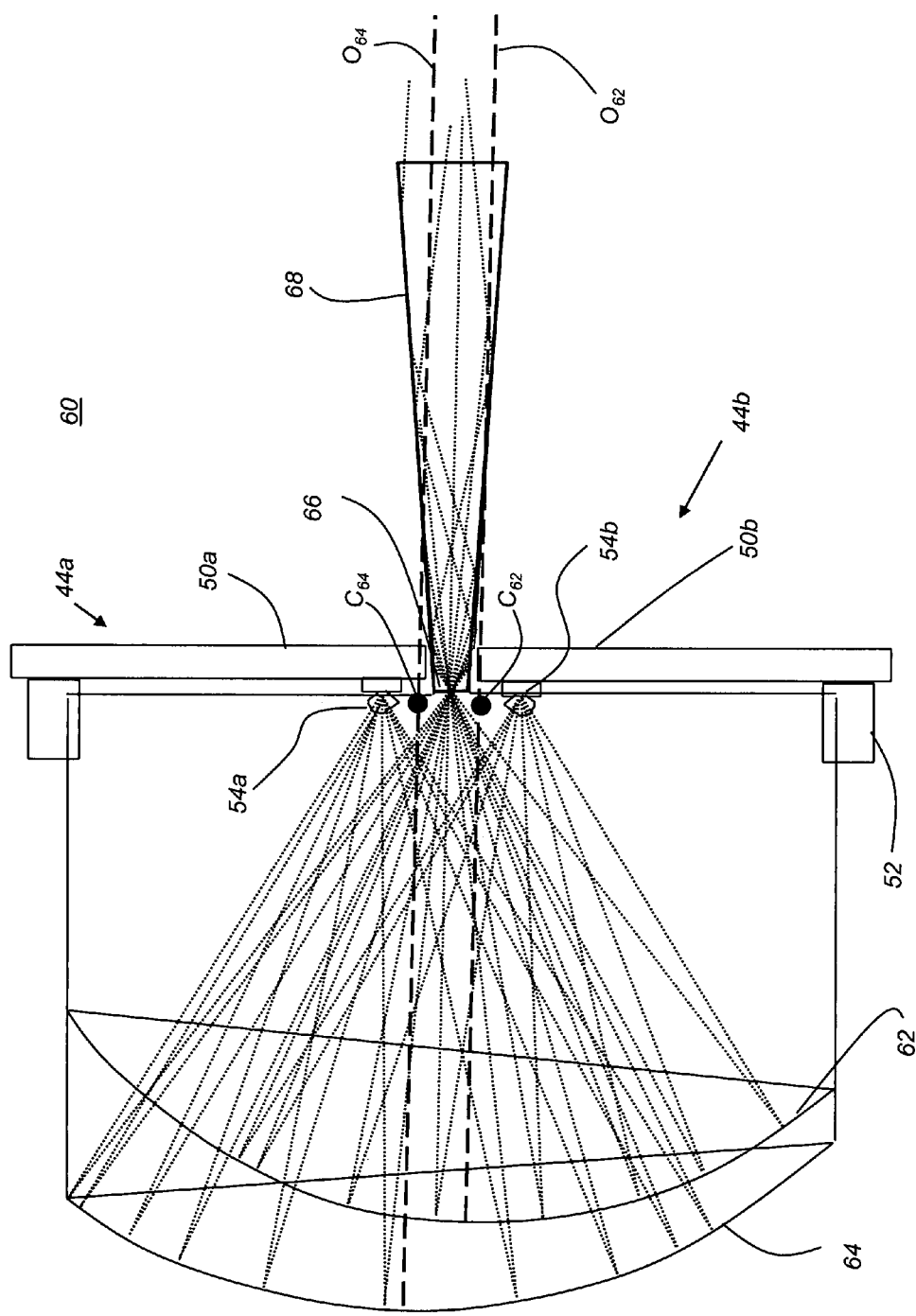
FIG. 5A is a cross-sectional side view showing light paths for an illumination apparatus in one embodiment.

FIG. 5A shows an illumination apparatus 60 in one embodiment of the invention. Illumination apparatus 60 uses a combination of two optical condenser systems 44a and 44b. In each respective optical condenser system 44a and 44b, source light is provided from one of two LED modules 50a and 50b, each similar to the device described with reference to FIG. 3. In optical condenser system 44b, with an optical path shown more clearly in FIG. 5B, LED module 50b has an LED package 54b that is placed to one side of the center of curvature $C_{62}$ of a first curved reflective surface 62. Center of curvature $C_{62}$ lies substantially halfway between LED package 54b and an aperture 66. In optical condenser system 44a, with an optical path shown more clearly in FIG. 5C, LED module 50a has an LED package 54a that is placed to one side of the center of curvature $C_{64}$ of a second curved reflective surface 64. With respect to either or both light sources, here LED packages 54a and 54b, second curved reflective surface 64 is considered to be behind first curved reflective surface 62. Center of curvature $C_{64}$ lies substantially halfway between LED package 54a and aperture 66. Optical axes 062 and 064 for curved surfaces 62 and 64 are non-collinear.

Figure 5B:
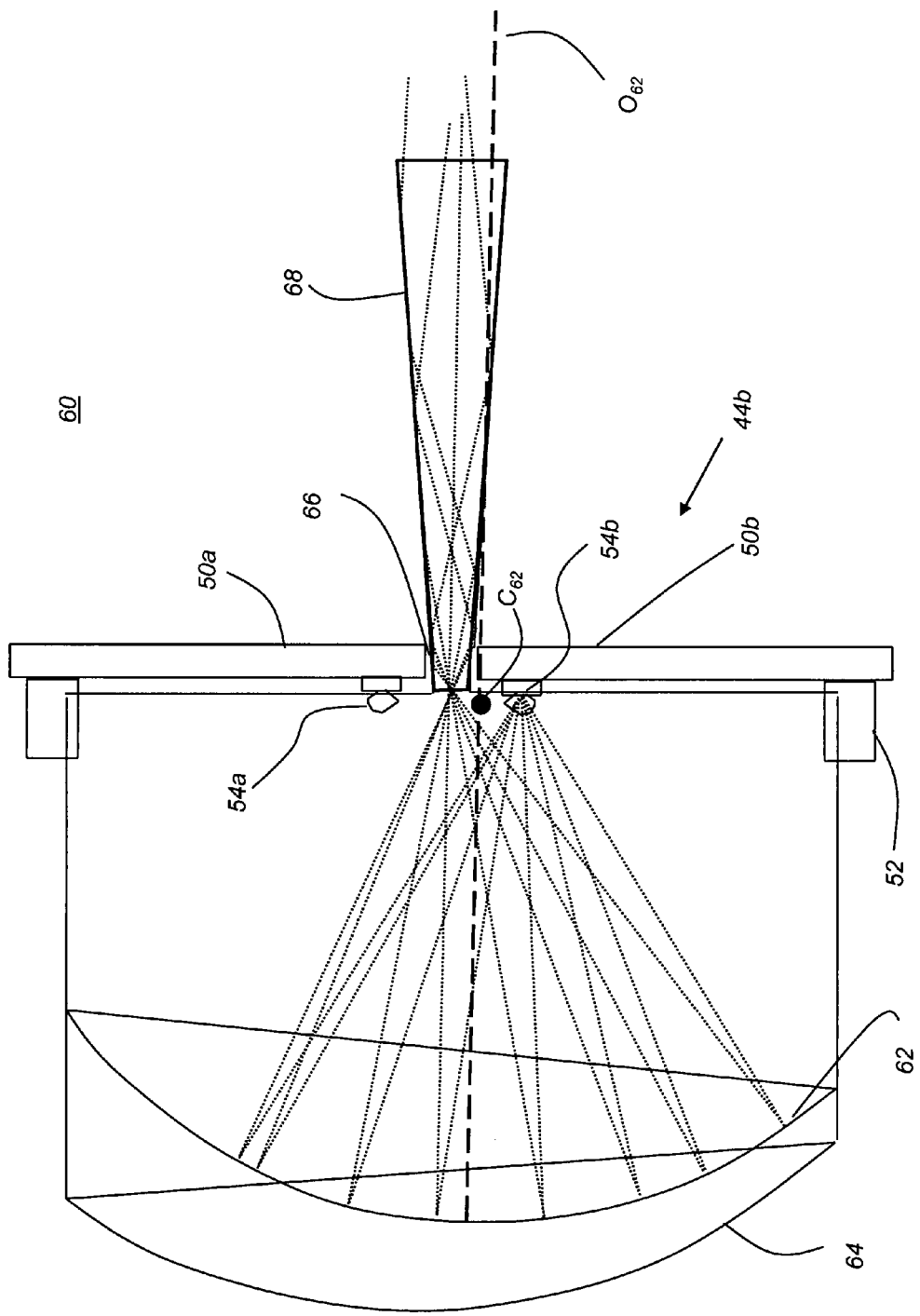
FIG. 5B shows the optical path of light from one of the light sources in the embodiment of FIG. 5A.
Figure 5C:
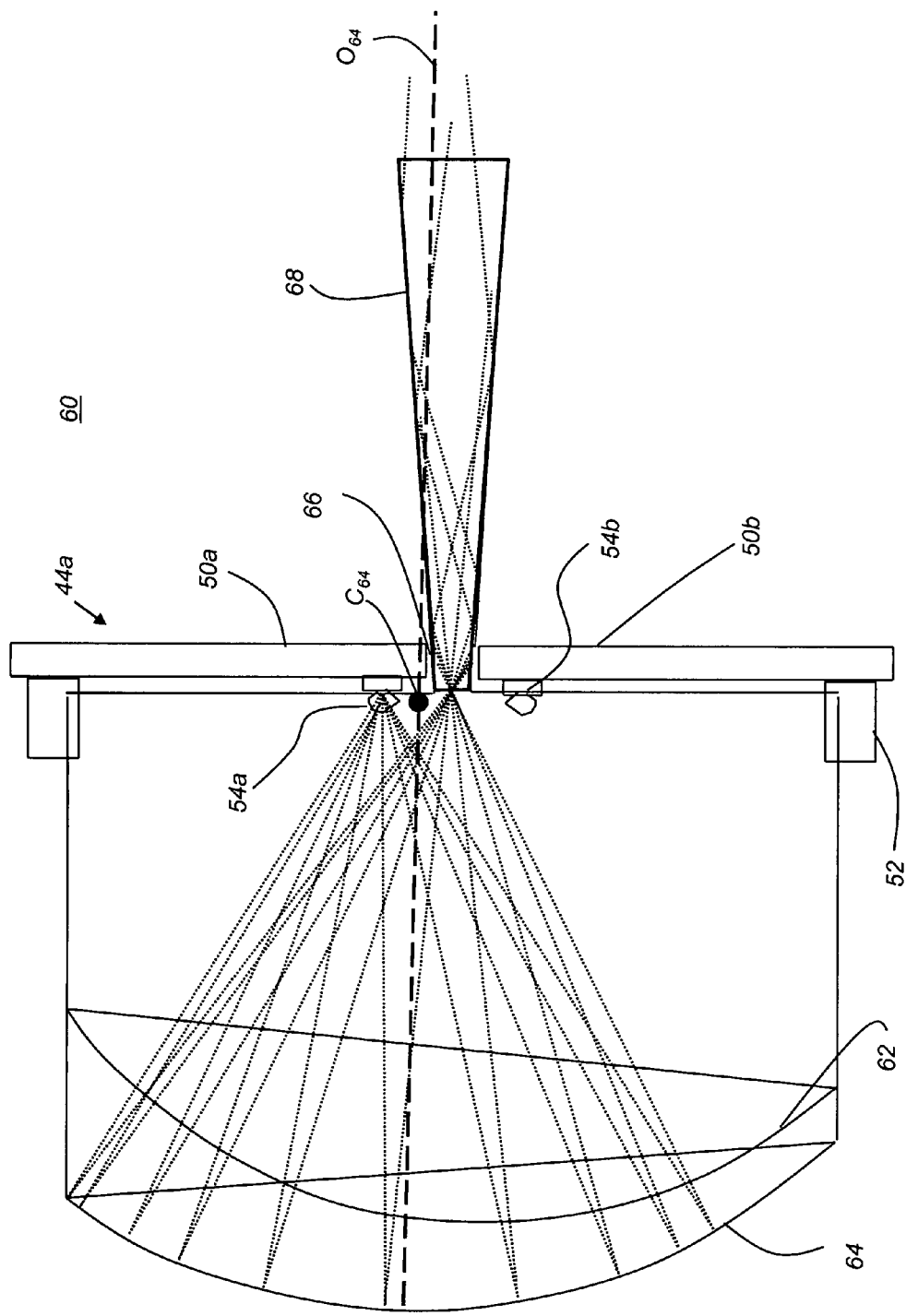
FIG. 5C shows the optical path of light from another of the light sources in the embodiment of FIG. 5A

Given this arrangement, then, illumination apparatus 60 of FIGS. 5A-5C combines two optical condenser systems sharing aperture 66 in common. In optical condenser system 44a of the embodiment shown, LED package 54a emits green light that follows the path shown in FIG. 5C. In the other optical condenser system 44b, LED package 54b on LED module 50b emits red and blue light that follows the optical path shown in FIG. 5B. The emitted light of both LED packages 54a and 54b goes toward a first reflective curved surface 62 that is treated with a dichroic coating. This dichroic coating conditions partially reflective surface 62 to act as a type of bandpass filter, transmitting or passing a green spectral band and reflecting light outside this band.

Figure 8:
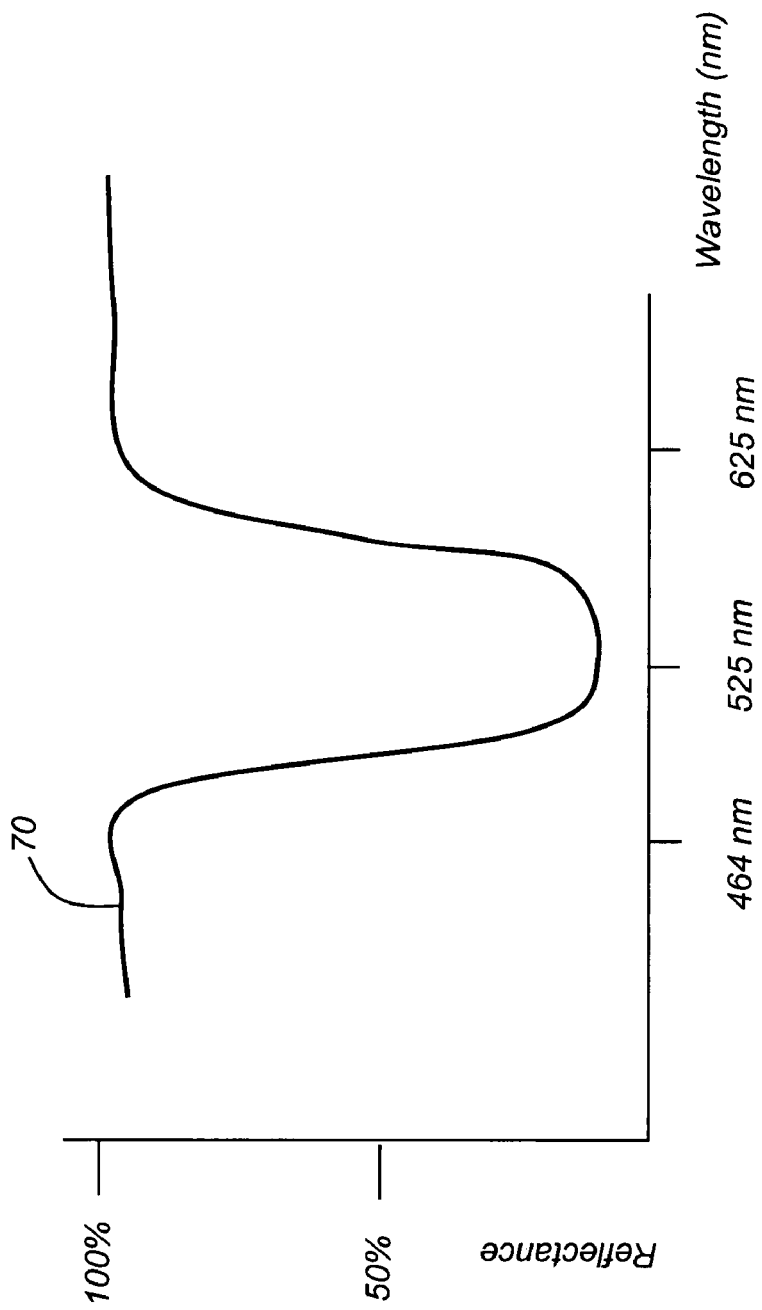
FIG. 8 is a graph showing a characteristic bandpass curve for reflectance.

The graph of FIG. 8 shows a reflectance curve 70 for this type of bandpass behavior. Here, there is very low reflectance for a spectral band around a central green wavelength (nominally about 525 nm), so that most of this light is transmitted through the dichroic surface.

Figure 6:
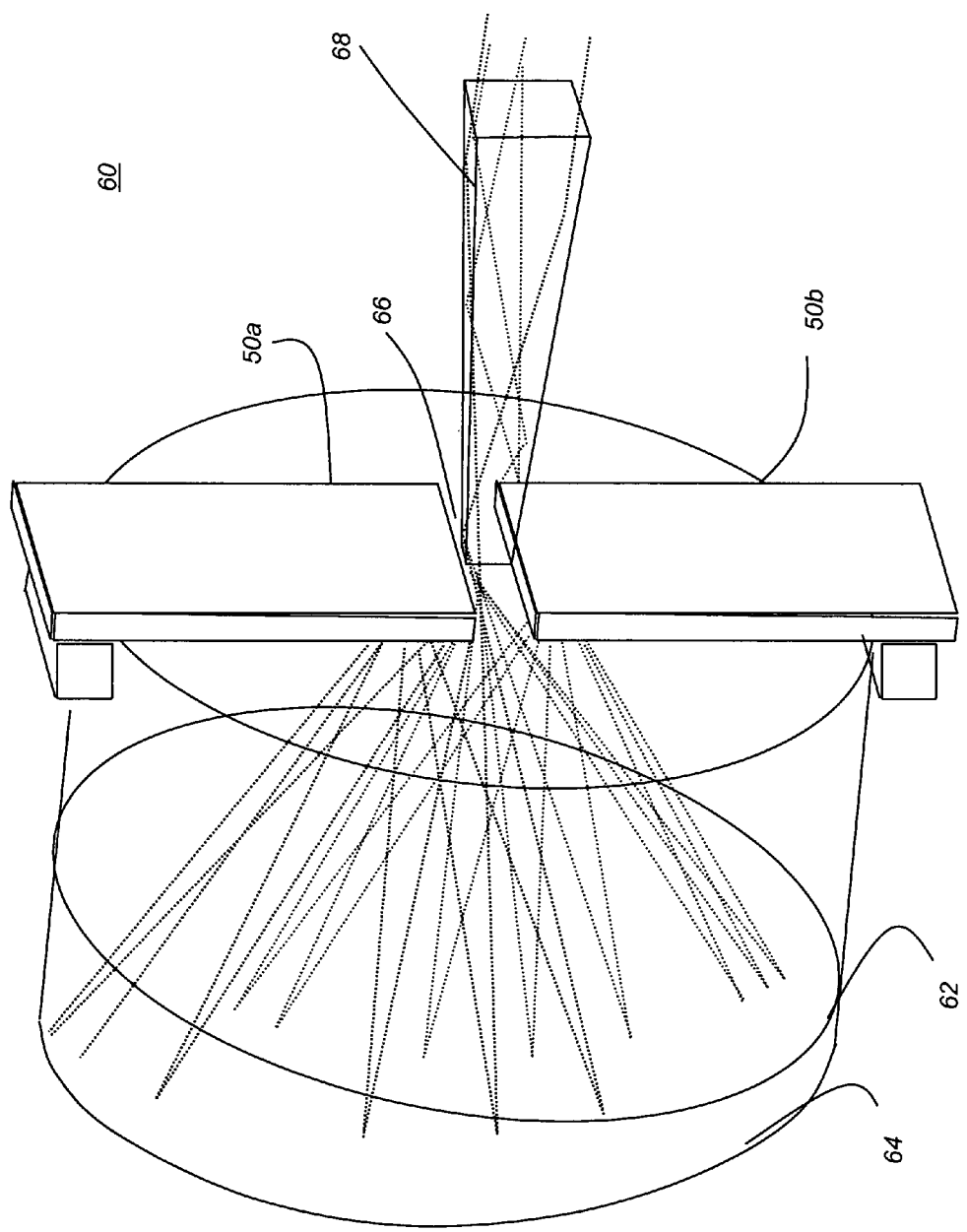
FIG. 6 is a perspective view showing the illumination apparatus of FIG. 4.

Referring back to optical condenser system 44b of FIG. 5B, light of other wavelengths outside the green bandpass region, such as red (nominally centered around 625 nm) and blue (nominally centered around 464 nm) is reflected from first reflective curved surface 62, with little transmittance. This red and blue reflected light is concentrated and directed along an optical path that exits at shared aperture 66 that lies between LED modules 50a and 50b. The perspective view of FIG. 6 shows the relative position of common aperture 66 with respect to LED modules 50a and 50b in clearer detail. It should be noted from FIG. 6 that illumination apparatus 60 is solid, that is, filled with a dielectric that is substantially transparent at the wavelengths of light that are combined. An optional light homogenizer, such as an integrator element 68 or integrator bar, is provided to homogenize or uniformize the emitted light from aperture 66. In the context of the present invention, the terms "uniformizer", "homogenizer", and "integrator element" are used interchangeably.

As shown best in FIG. 5C, second reflective curved surface 64 acts as a substantially spherical mirror for incident light that was transmitted through first curved surface 62, a green spectral band in this exemplary embodiment. Second curved reflective surface 64 concentrates this green light and similarly directs it along an optical path that leads toward an exit at common aperture 66. As a result, concentrated light from both LED packages 54a and 54b is combined as it exits at common aperture 66.

A number of observations for the embodiment of FIGS. 5A-5C are particularly instructive:

(i) In each optical condenser system 44a and 44b, each center of curvature ($C_{62}$ and $C_{64}$) for each reflective curved surface (62 and 64) lies substantially halfway between its corresponding LED package (54b and 54a, respectively), and shared aperture 66 in the plane that contains these light sources. As was described with reference to FIG. 4, this arrangement is used to image the light source to the aperture.

(ii) The centers of curvature $C_{62}$ and $C_{64}$ and light sources, LED packages 54a and 54b, all lie substantially in the same plane that includes common aperture 66. The centers of curvature $C_{62}$ and $C_{64}$ are non-coincident.

(iii) In each optical path, incident light from the light sources to reflective curved surfaces 62 and 64 is at relatively low angles with respect to normal. As was emphasized in the background description given earlier, low angular incidence is advantageous for good dichroic performance and yields improved spectral separation.

(iv) Light output from integrator element 68 or other type of light uniformizer or homogenizer can be uniformly mixed and can be at an etendue that is only very slightly larger than the etendue of either of the single light sources, LED packages 54a and 54b. The etendue of the combined output must increase somewhat because the source images enter homogenizer or integrator element 68 with a slight angle between them. This angle can be reduced by making the radii of curved surfaces 62 and 64 larger, but at the expense of increased thickness and diameter.

After reflection, the light from both LED packages 54a and 54b is concentrated at its arrival at common aperture 66. Integrator element 68 is positioned at or near aperture 66 as a light homogenizer in order to provide good color mixing and uniformity. Integrator element 68 may be straight or tapered, as shown in FIG. 5A. Various types of integrator element 68 could be used, including an integrator bar, a fly's-eye lenslet array or similar optical element, a hollow light pipe or light tunnel, a compound parabolic concentrator, one or more lenses, a mirror, or a diffuser or other device.

The tapered shape of integrator element 68 can be useful for changing the distribution of the etendue, as described earlier. At the exit face of integrator element 68, the light from each color is spatially uniform.

Figure 7A:
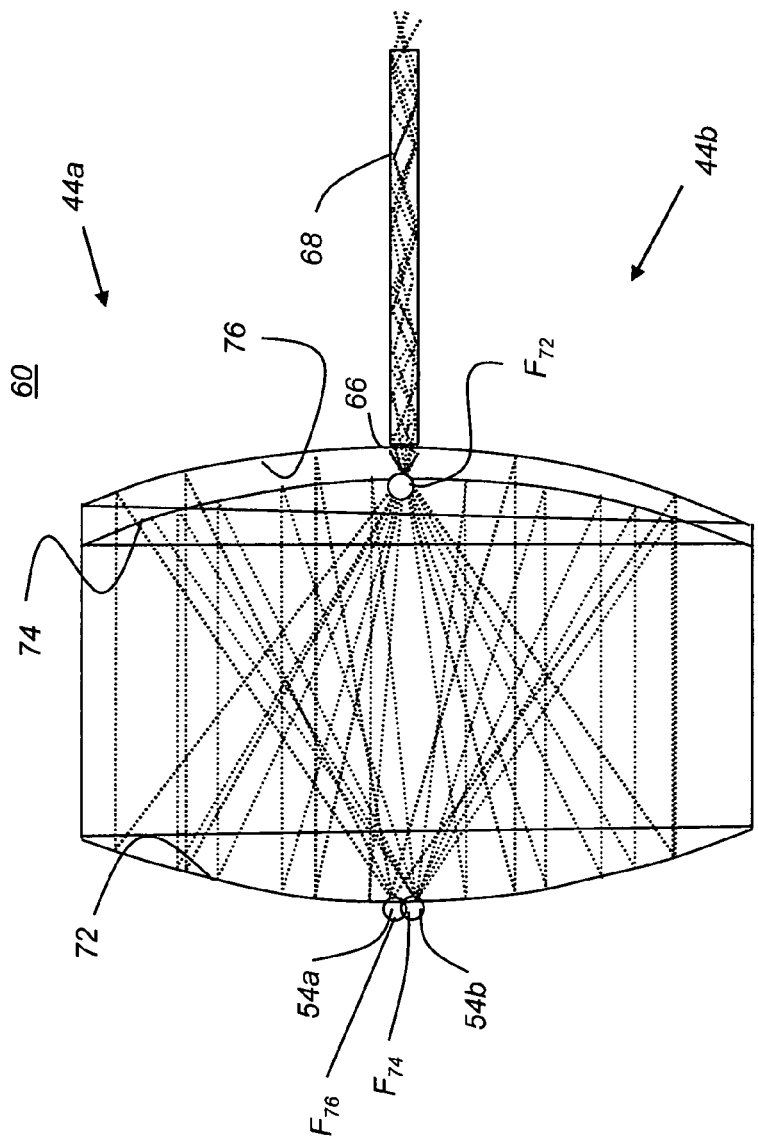
FIG. 7A is a cross-sectional side view showing light paths for an illumination apparatus using opposed paraboloid mirrors.
Figure 9B:
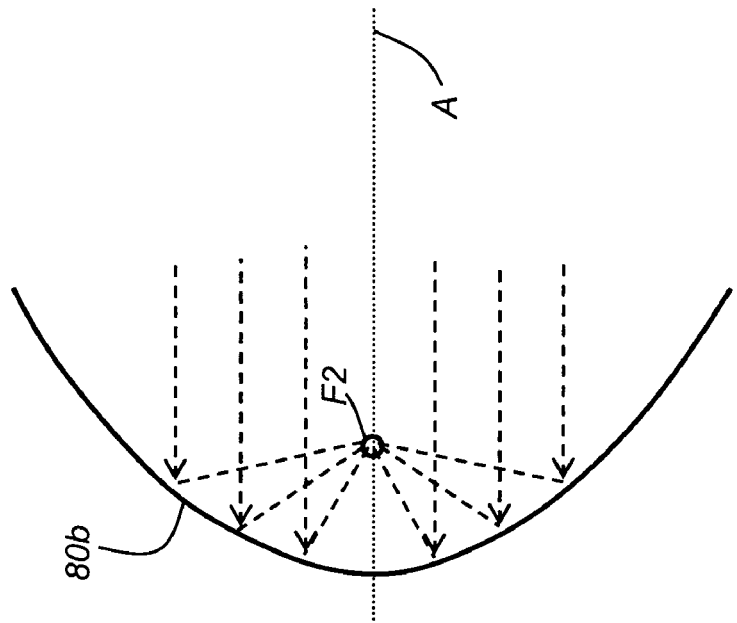
FIGS. 9A and 9B are cross sections showing behavior of paraboloid mirrors.
Figure 9A:
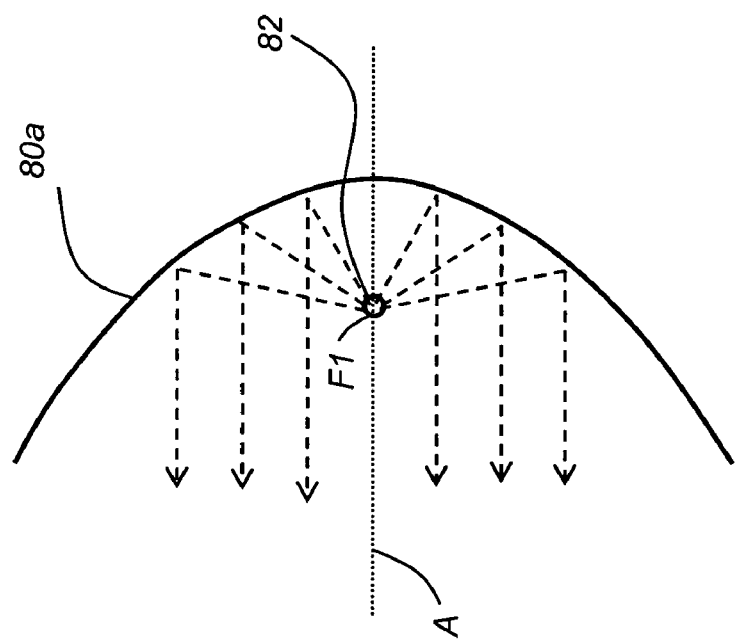

FIG. 7A shows another embodiment of illumination apparatus 60 using similar principles as the FIG. 5A embodiment, again having first and second optical condenser systems 44a and 44b sharing the same aperture 66, here using an arrangement of opposed parabolic reflectors in each optical path. In order to better understand how this arrangement works, it is instructive to review some useful properties of parabolic reflectors. Referring to FIG. 9A, a light source 82 is disposed at the focus F1 of a parabolic mirror 80a having an axis A. Light emitted from light source 82 is therefore reflected in the direction parallel to axis A. FIG. 9B shows a parabolic mirror 80b with incident light parallel to its axis A. Here, the collimated, on-axis incident light is directed to its focus F2.

A well known optical illusion device, known by various names including "parabolic wok", operates by combining the basic principles described with reference to FIGS. 9A and 9B. In such a device, two parabolic mirrors are cupped together, with opposed curvature but sharing the same axis, giving the device its characteristic wok shape. The top mirror has an aperture at its vertex. An object that is placed at the vertex of the bottom mirror is imaged by this combination and thus appears to float in space at the aperture of the oppositely disposed top mirror. Of course, this type of arrangement, by itself, offers no apparent benefits for illumination apparatus, but illustrates one of the principles used in the FIG. 7A embodiment.

Returning to illumination apparatus 60 of FIG. 7A, opposed parabolic reflectors are paired to form first and second optical condenser systems 44a and 44b and employed in a novel manner for obtaining light from two or more solid-state light sources and combining this light onto the same optical path to provide illumination. Here, by comparison with the embodiment of illumination apparatus 60 described with reference to FIG. 5A, first and second LED packages 54a and 54b are positioned opposite aperture 66 and near the vertex of a rear reflective curved surface 72. Reflective curved surface 72 is preferably a paraboloid and is paired with each of two other curved surfaces and is in the optical path of each of first and second optical condenser systems 44a and 44b. Here, a dichroic curved surface 74 has a focus $F_{74}$ that is near LED package 54b. A reflective curved surface 76 has a focus $F_{76}$ that is near LED package 54a and is non-concentric with focus $F_{74}$. Both curved surfaces 74 and 76 are preferably paraboloids. With respect to either or both light sources, LED packages 54a and 54b, reflective curved surface 76 is considered to be behind dichroic curved surface 74. Dichroic curved surface 74 is treated to reflect a spectral band of light from LED package 54b and to pass or transmit other light that is outside this spectral band. Curved surface 76 reflects light outside this reflected spectral band; i.e., the light that passes through dichroic curved surface 74.

Figure 7B:
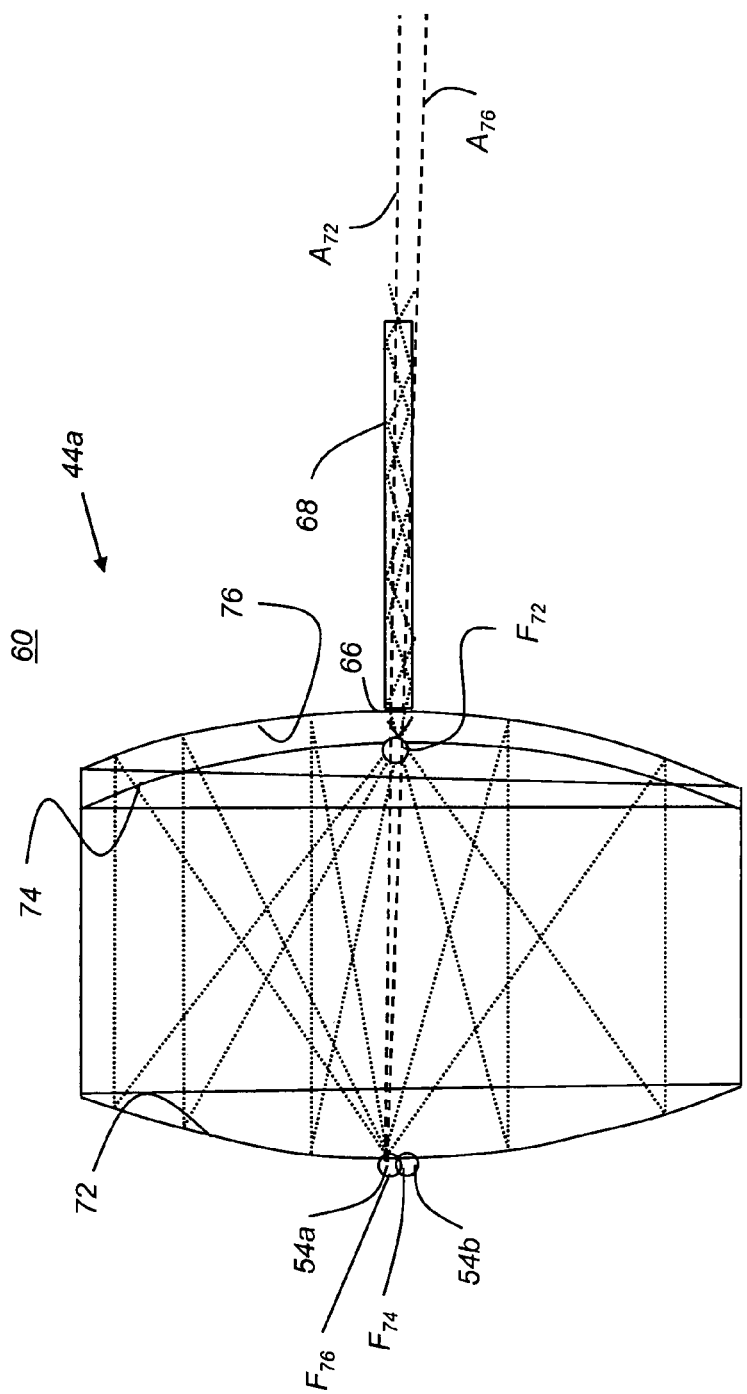
FIG. 7B shows the optical path of light from one of the light sources in the embodiment of FIG. 7A.

Much like the overall arrangement of illumination apparatus 60 of FIG. 5A, illumination apparatus 60 of FIG. 7A combines two optical condenser systems 44a and 44b that share common aperture 66. The behavior of each system is described respectively with reference to FIGS. 7B and 7C. FIG. 7B shows one optical condenser system 44a that uses the combination of concave reflective curved surface 72 having axis $A_{72}$ and, with opposed curvature, concave dichroic curved surface 76 having axis $A_{76}$. Axes $A_{72}$ and $A_{76}$ are non-collinear and may be either parallel or non-parallel in a parabolic embodiment. LED package 54a is positioned along axis $A_{76}$ and near the vertex of concave reflective curved surface 72. The concavity of concave curved surfaces 74 and 76 is opposed to the concavity of concave reflective curved surface 72.

Given this arrangement, light from LED package 54a passes through dichroic curved surface 74 and is reflected and collimated by curved surface 76. This collimated light, substantially parallel to axis $A_{72}$ of reflective curved surface 72, is then redirected along the optical path of optical condenser system 44a by reflective curved surface 72 toward focus $F_{72}$, exiting at aperture 66 in accordance with the well-known parabolic reflector principles just described.

Figure 7C:
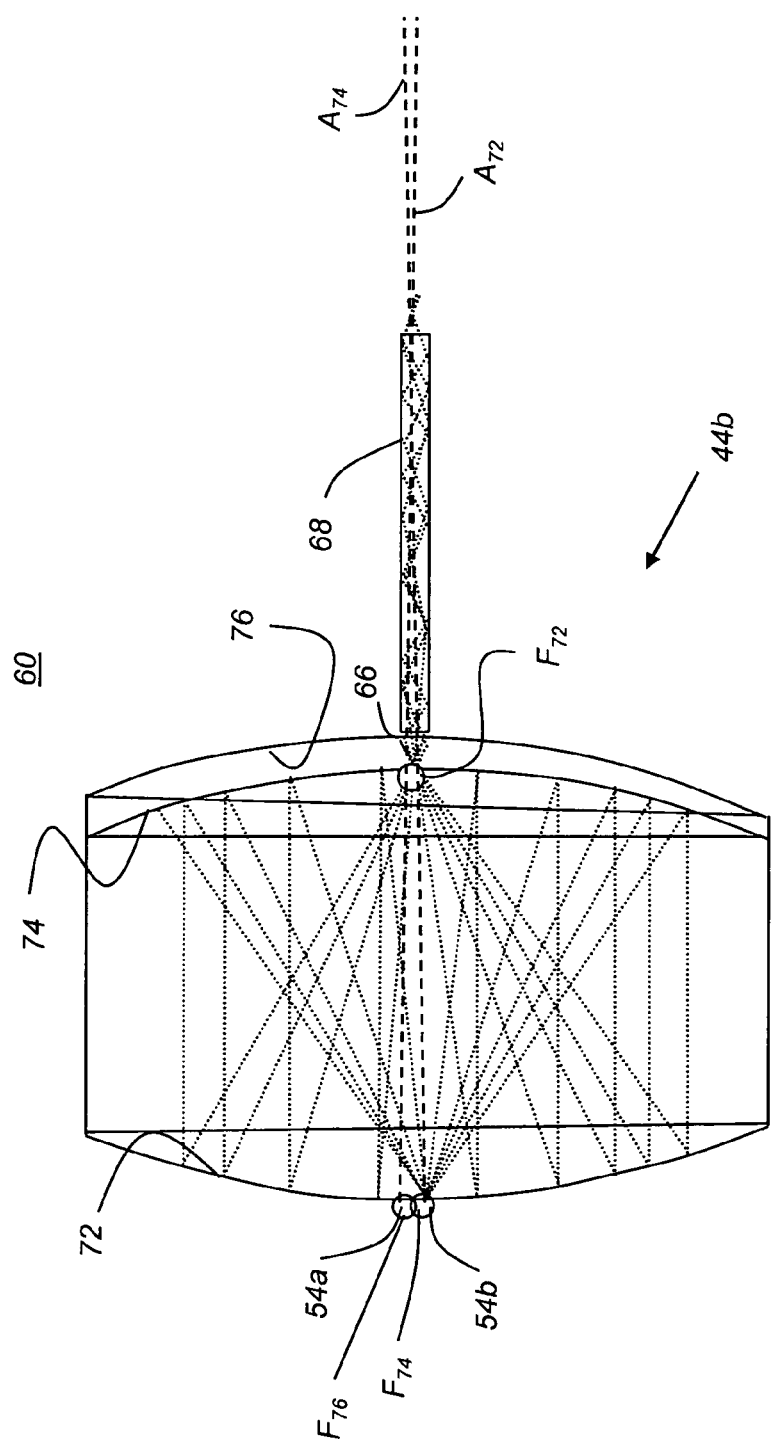
FIG. 7C shows the optical path of light from another of the light sources in the embodiment of FIG. 7A

FIG. 7C shows the operation of the other optical condenser system 44b for directing light from LED package 54b. LED package 54b is positioned along axis $A_{74}$ and near the vertex of reflective curved surface 72. Given this arrangement, light from LED package 54b is reflected and collimated by dichroic curved surface 74. This collimated light, substantially parallel to axis $A_{72}$ of reflective curved surface 72, is then also redirected along the optical path of optical condenser system 44b by reflective curved surface 72 toward focus $F_{72}$ at aperture 66, in accordance with the same parabolic reflector principles just described. In this way, as shown for the combined optical condenser systems in FIG. 7A, light from both LED packages 54a and 54b is combined, that is, their light paths are effectively superimposed, at common aperture 66 that is substantially coincident with the input surface of light integrator element 68.

A number of observations for the embodiment of FIG. 7A are particularly instructive:
  (i) All three curved surfaces 72, 74, and 76 operate best when they are most nearly ideal paraboloids. As the shapes of these surfaces deviate from this ideal, performance will degrade accordingly.
  (ii) Light that exits integrator element 68 is uniformly mixed and can have an etendue that is only very slightly larger than the etendue of either of the single sources 54a and 54b.
  (iii) LED packages 54a and 54b can be spaced closely together with this embodiment, provided that each lies nearest the focus for its corresponding reflective surface.
  (iv) Curved surface 72 performs no spectral separation but acts simply as a light re-director common to both optical systems, lying along the optical paths of both optical condenser systems 44a and 44b.

As has been emphasized, best results are obtained when the shape of each curved reflective surface in this embodiment is as nearly symmetrically paraboloid as possible. The exact positioning of these curved reflective surfaces relative to each other, on the other hand, requires some slight amount of asymmetry. For example, ideally, axes $A_{72}$, $A_{74}$, and $A_{76}$ should be at least close to parallel, but non-collinear. This means that dichroic curved surface 74 and reflective curved surface 76 must be optically decentered with respect to each other and neither of axes $A_{74}$ or $A_{76}$ collinear with axis $A_{72}$ for this embodiment. Since each axis $A_{74}$ and $A_{76}$ is centered on one of LED packages 54a or 54b, the relative size of LED packages 54a and 54B indirectly determines the limit for how close to collinear these axes can be. These LED devices can be adjacent to each other near the vertex of reflective curved surface 76 or can be spaced apart from each other by some small distance.

With both the FIG. 5A and FIG. 7A embodiments, the spaces between light sources and the pair of curved reflective surfaces are filled with a dielectric material that is transparent to visible light. The light sources, LED packages 54a and 54b, are preferably in optical contact with the dielectric material, either immersed or bonded, such as with epoxy for example. Optical contact helps to reduce Fresnel reflections and yields improved control over light emission angles and consequent capture of the light.

Both the FIG. 5A and FIG. 7A embodiments direct light from two or more light sources to exit at a common aperture using two or more optically decentered concave reflective surfaces. The concave surface that is closest to the light sources is a dichroic surface that is treated to reflect light over at least one spectral band and to transmit or pass other light. With the FIG. 5A embodiment, aperture 66 lies between the light sources. With the FIG. 7A embodiment, aperture 66 lies at the vertices of these concave reflective surfaces. With either configuration, light that is not reflected from the dichroic surface transmits twice through the dichroic surface in opposite directions.

It can be observed that the general method of using decentered and dichroically treated curved reflective surfaces can be further expanded beyond the embodiments of illumination apparatus 60 that are shown. For example, a third LED package and a third reflective surface could be added to either the FIG. 5A embodiment or the FIG. 7A embodiment, thereby forming a third optical condenser system that similarly shares the common aperture of the first two optical condenser systems 44a and 44b. Two or more of the curved reflective surfaces would then be dichroic surfaces. With respect to FIG. 6, for example, a third LED package could be added to either side of aperture 66 or three LED packages could be arranged in the same plane around aperture 66 in some other manner, such as 120 degrees apart from each other, for example.

It is recognized by those skilled in the optical design arts that some latitude must be allowed for phrases such as "near the focal region", "at the focus", "at the focal region", or "near the vertex". Practical optomechanical tolerances allow some variability in precise positioning according to the principles used in this teaching of the present invention. Dimensions of the devices themselves impose some constraints. As was noted earlier, precise spherical or parabolic shaped surfaces can be the ideal reflective surfaces for focus collimation in various embodiments. However, in practice, only an approximation to a spherical or paraboloid surface can be achieved and can be sufficient to yield acceptable results in applying the techniques of the present invention.

It can be observed that, even with high-performance dichroic surfaces, there is inevitably some amount of spectral contamination, since dichroic response is imperfect. For any of the embodiments shown hereinabove, spectral bands can be defined and optimized as best suits the requirements of an application. Additionally, it must be noted that while embodiments described herein employ one dichroic surface, other surfaces more generally referred to as "reflective" could be treated with dichroic coatings, which can provide a highly efficient alternative to silvered reflectors or other types of conventional mirror coatings.

It can also be observed that some amount of coma is exhibited in both FIG. 5A and FIG. 7A embodiments. This has the effect of slightly distorting the cross-sectional outline of the beam output at aperture 66. However, in projector applications, the SLM itself typically requires light in a rectangular aspect ratio. Thus, this elongation in one direction can be useful in a projection apparatus, when matched to the aspect ratio of the light modulator and subsequent projection optics.

Figure 10:
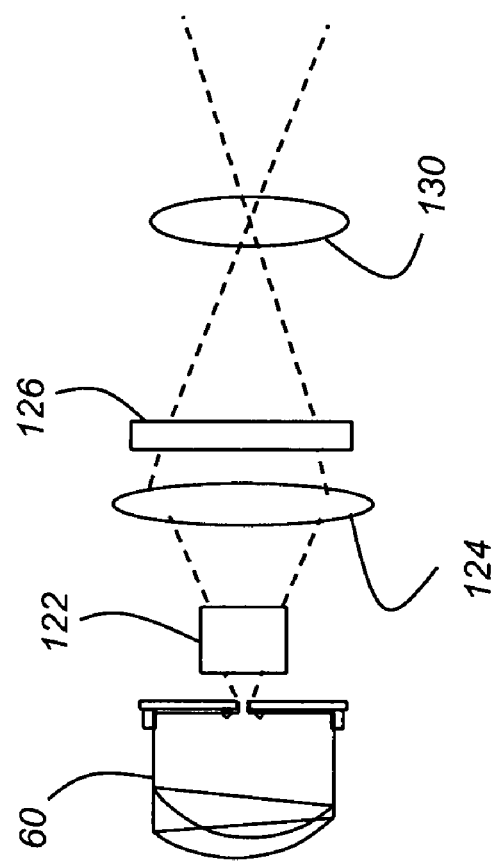
FIG. 10 is a schematic block diagram of a display apparatus using the illumination apparatus of the present invention in one embodiment.
Figure 11:
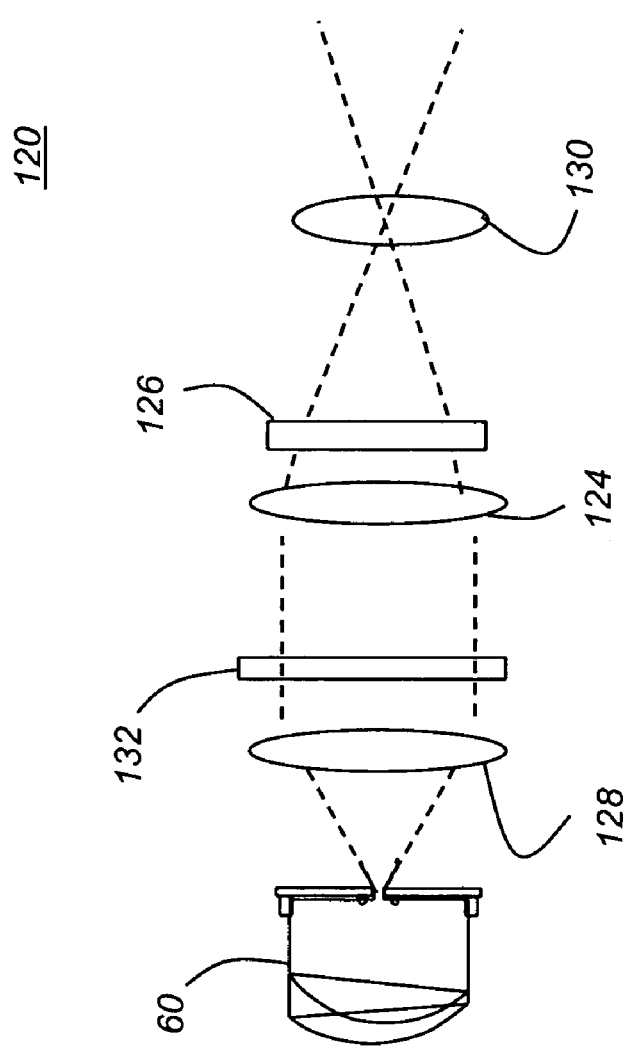
FIG. 11 is a schematic block diagram of a display apparatus using the illumination apparatus of the present invention in an alternate embodiment.

FIGS. 10 and 11 show alternate component arrangements for forming a display apparatus 120 that provides modulated light using illumination apparatus 60 of the present invention. Light from illumination apparatus 60 is directed to a light uniformizer or homogenizer 122, such as an integrator bar, fly's-eye lens array, or other component that improves light uniformity and, where necessary, improves color mixing. A field lens 124 or other optical assembly then directs the light to spatial light modulator (SLM) 126, which may be a digital micromirror device, liquid crystal display device, or other modulator. Modulated light is then provided at the pupil of a projection lens 130 for projection onto a display surface.

In the embodiment of FIG. 11, an optional collimating lens 128 directs light to a diffuser 132, such as an Engineered Diffuser™ fabricated by RPC Photonics Inc., Rochester, N.Y. With either the FIG. 10 or 11 embodiment, illumination apparatus 60 of the present invention could be used to provide a single color at a time, so that SLM 126 operates in color-sequential order, familiar to those skilled in the electronic display arts. Alternately, polychromatic or white light could be provided for modulation, such as when using a color filter array with a liquid crystal SLM, for example.

Unlike conventional color combination methods as described earlier in the background section, the illumination apparatus of the present invention is relatively polarization-insensitive. Thus, the light that is generated can be used directly with some types of light modulators, such as the digital micromirror and similar devices. Polarizing components would be required to condition the light polarization for liquid crystal device (LCD) type SLMs.

By effectively superimposing the light from LED packages 54a and 54b, the illumination apparatus of the present invention combines the light paths from separate color sources while maintaining a small etendue for the color illumination beam. Providing a small etendue has advantages for use with small-sized SLMs and is an advantage over many conventional light-mixing apparatus.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, while the method of the present invention is directed to high-brightness applications, other applications requiring efficient mixing of different colored light could also use this approach. Another possible alternative to the use of R, G, and B LEDs is the use of only two different colors, or the use of four or more LED colors. While ideal performance is obtained using spherical, ellipsoidal, or paraboloid shapes as noted in the description, approximations of these curved shapes may provide a sufficient level of performance.

Thus, the present invention describes an illumination apparatus and method for combining light from solid-state light sources.

The invention claimed is:

1. An illumination apparatus comprising:
   first and second optical condenser systems sharing a common aperture, the first optical condenser system comprising:
      a first solid-state light source having a first spectral band;
      a first curved surface spaced apart from the first solid-state light source and treated to reflect the first spectral band along a first optical path to exit at the common aperture and to pass light outside the first spectral band;
   and the second optical condenser system comprising:
      a second solid-state light source having a second spectral band;
      a second curved surface disposed behind the first curved surface with respect to the first and second light sources and treated to reflect the second spectral band along a second optical path to exit at the common aperture.

2. The illumination apparatus of claim 1 wherein the aperture lies in the plane containing the first and second solid-state light sources.

3. The illumination apparatus of claim 1 wherein the first and second optical paths further comprise a third curved surface having the common aperture at its focus.

4. The illumination apparatus of claim 1 wherein the first and second solid-state light sources are taken from the group consisting of light-emitting diodes, organic light-emitting diodes, and polymer light-emitting diodes.

5. The illumination apparatus of claim 1 wherein at least one of the first and second curved surfaces is a dichroic surface.

6. The illumination apparatus of claim 1 further comprising a light integrator element disposed to treat light that exits the common aperture.

7. The illumination apparatus of claim 6 wherein the light integrator element is taken from the group consisting of a lenslet array, a fly's-eye lenslet array, a light tunnel, an integrator bar, a mirror, one or more lenses, a compound parabolic concentrator, and a diffuser.

8. The illumination apparatus of claim 1 further comprising a light modulator for modulating light that exits the common aperture.

9. The illumination apparatus of claim 1 wherein the first curved surface has a shape that is substantially spherical, ellipsoidal, or paraboloid.

10. The illumination apparatus of claim 1 wherein the first and second solid-state light sources are optically immersed in a dielectric.

11. An illumination apparatus comprising:
   a) a first curved surface treated to pass a first spectral band and to reflect light outside the first spectral band toward an aperture;
   b) at least a first solid-state light source having a first spectral band and disposed to one side of the aperture;
   c) a second curved surface treated to reflect the first spectral band and disposed behind the first curved surface with respect to the first solid-state light source; and
   d) at least a second solid-state light source having a second spectral band and disposed to another side of the aperture.

12. The illumination apparatus of claim 11 further comprising an integrator element having an input portion disposed near the aperture.

13. The illumination apparatus of claim 11 wherein the first curved surface has a shape that is substantially spherical, ellipsoidal, or paraboloid.

14. The illumination apparatus of claim 11 wherein the first curved surface has a dichroic coating that allows the first spectral band to pass and that reflects light outside the first spectral band.

15. The illumination apparatus of claim 11 wherein the second curved surface has a dichroic coating.

16. An illumination apparatus comprising:
   a) a first concave curved reflective surface having a first axis and a first vertex;
   b) a second concave curved surface treated to reflect light of a first spectral band and to transmit other light and having a second axis and a second vertex, wherein the concavity of the second concave curved surface is opposed to the concavity of the first concave curved reflective surface and the second axis is non-collinear with the first axis;
   c) a third concave curved surface behind the second concave curved surface with respect to the first concave curved reflective surface and treated to reflect light transmitted through the second concave curved surface, and further having a third axis non-collinear with the second axis and having a third vertex, d) a first solid-state light source disposed near the first vertex and along the second axis;

e) a second solid-state light source disposed near the first vertex and along the third axis; and f) an aperture extending through the second and third vertices.

17. The illumination apparatus of claim 16 further comprising a light-integrator element having an input portion disposed near the aperture.

18. The illumination apparatus of claim 16 wherein the second concave curved surface has a dichroic coating.

19. The illumination apparatus of claim 16 wherein the second concave curved surface is substantially parabolic.

20. The illumination apparatus of claim 16 wherein any two of the first, second, and third axes are parallel.

21. A method for providing illumination comprising:

a) directing light from a first solid-state light source having a first spectral band toward a first curved surface;

b) directing light from a second solid-state light source having a second spectral band toward the first curved surface;

c) reflecting light of the first spectral band along a first optical path to exit at a common aperture and passing light of the second spectral band from the first curved surface; and d) reflecting light of the second spectral band from a second curved surface back through the first curved surface and along a second optical path to exit at the common aperture.

* * * * *